(12) United States Patent
Mann

(10) Patent No.: US 11,257,598 B2
(45) Date of Patent: Feb. 22, 2022

(54) POSITIONING AND INSPECTION APPARATUSES FOR USE IN NUCLEAR REACTORS

(71) Applicant: GE-Hitachi Nuclear Energy Americas LLC, Wilmington, NC (US)

(72) Inventor: Jason D. Mann, Wilmington, NC (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 446 days.

(21) Appl. No.: 16/166,881

(22) Filed: Oct. 22, 2018

(65) Prior Publication Data
US 2020/0126681 A1  Apr. 23, 2020

(51) Int. Cl.
*G21C 17/013* (2006.01)
*G21C 17/01* (2006.01)
*G21C 19/20* (2006.01)

(52) U.S. Cl.
CPC .......... *G21C 17/013* (2013.01); *G21C 17/01* (2013.01); *G21C 19/207* (2013.01)

(58) Field of Classification Search
CPC .... G21C 17/003; G21C 17/007; G21C 17/01; G21C 17/013; G21C 19/207
See application file for complete search history.

(56) References Cited

U.S. PATENT DOCUMENTS

| 5,178,820 A | 1/1993 | Glass, III et al. |
| 5,271,046 A * | 12/1993 | Dirauf .................... G21C 17/01 376/249 |
| 7,512,207 B2 * | 3/2009 | Smith .................. G21C 17/003 376/249 |
| 2004/0032924 A1 | 2/2004 | Judge |
| 2004/0258190 A1 * | 12/2004 | Neau ..................... G21C 17/00 376/249 |
| 2005/0135904 A1 | 6/2005 | Wivagg et al. |

(Continued)

FOREIGN PATENT DOCUMENTS

| JP | 2552226 | 6/1996 |
| KR | 10-2005-0017724 | 2/2005 |

OTHER PUBLICATIONS

WIPO, International Search Report in Corresponding Application PCT/US2019/057338, dated Feb. 11, 2020.

(Continued)

*Primary Examiner* — Sharon M Davis
(74) *Attorney, Agent, or Firm* — Ryan Alley IP

(57) ABSTRACT

Systems are provided for inspection and tooling submerged in nuclear reactors. Systems mount at the reactor edge, such as on a steam dam, to be independently operable from a refueling bridge or refueling operations. A moveable steam dam clamp may hold a position apparatus at the edge. The positioning apparatus includes a rotatable shoulder and arms move a tool, reactor component, and/or inspection device like a camera or VARD to desired and highly-determinable reactor positions. A float may counter shear and rotation on the shoulder from the arms. Motors at the shoulder with internal transmissions may rotate the shoulder and arms, or manual rotation may be used. The arms may also overlap vertically for installation and removal. Power, controls, and/or data may be provided underwater through an umbilical connection to operators.

18 Claims, 4 Drawing Sheets

(56) References Cited

U.S. PATENT DOCUMENTS

| | | | |
|---|---|---|---|
| 2007/0146480 A1* | 6/2007 | Judge | G21C 17/013 348/83 |
| 2007/0189858 A1* | 8/2007 | Nakagawa | G21C 17/013 405/190 |
| 2010/0242660 A1* | 9/2010 | Offer | G21C 17/01 74/490.05 |
| 2013/0329848 A1 | 12/2013 | Linnebur | |
| 2014/0270038 A1* | 9/2014 | Delaune | G21C 17/013 376/249 |
| 2015/0332796 A1* | 11/2015 | Park | G21C 19/02 376/260 |
| 2017/0140844 A1 | 5/2017 | Kelemen | |
| 2018/0053572 A1 | 2/2018 | Vigliano et al. | |

OTHER PUBLICATIONS

WIPO, Written Opinion in Corresponding Application PCT/US2019/057338, dated Feb. 11, 2020.

\* cited by examiner

POSITIONING AND INSPECTION APPARATUSES FOR USE IN NUCLEAR REACTORS

BACKGROUND

FIG. 1 is selective view of a related art nuclear core shroud 10, useable in a nuclear reactor like a BWR. Core shroud 10 may be positioned in annulus region 20, which is an annular space formed between shroud 10 and an inner wall of a reactor pressure vessel (not shown) that receives fluid coolant flow and directs it downward for entry at a bottom of core 30. Shroud 10 may be a cylindrical structure surrounding core 30 that partitions the reactor into these downward and upward coolant flows on opposite radial sides of shroud 10. One or more jet pump assemblies 40 may line annulus 20 and direct coolant flow in this manner.

After being directed downward past core shroud 10, coolant may then flow up through core 30 inside shroud 10. Core 30 is typically populated by several fuel assemblies (not shown) generating heat through nuclear fission during operation, and the coolant exiting core 30 may be quite energetic and potentially boiling. This energetic fluid flows up through and out of core 30 and shroud 10, potentially into steam separating and drying structures and ultimately to a turbine that drives a generator to convert the energetic flow into electricity. The top portion 15 of shroud 10 may terminate below such drying structures, and various core equipment may rest on or join to shroud 10 about top portion 15, which may be called a steam dam. One or more gussets 16 may be aligned about top portion 15 of shroud 10 to support or join a shroud head (not shown), chimney, or drying structures.

During a reactor outage, such as a refueling outage or other maintenance period, the reactor vessel may be opened and inspected, and internal structures of vessel may be removed. During an outage, loading equipment such as a bridge and trolley above the reactor, and 40-50 feet above core 30 and shroud 10, may move and load new fuel assemblies in core 30. Visual inspections of shroud 10, core 30, and/or any other component can be accomplished with video or camera equipment operated from the bridge or other loading equipment above the reactor during this time. For example, the positioning and inspection devices of co-owned US Pat Pub 2017/0140844 to Kelemen, published May 18, 2017, incorporated herein by reference in its entirety, may be used in connection with inspections from steam dam 15.

SUMMARY

Example embodiments include apparatuses, devices, and systems including the same for moving inspection and tooling articles in congested underwater areas, such as nuclear reactors undergoing maintenance, refueling, or inspection. Example embodiments are operable from a far edge of the reactor, such as on a steam dam or outer wall of the reactor. An apparatus shoulder can mount at this edge, such as via a clamping device secured to a steam dam. The shoulder may be rotatable and include arms that are further rotatable. A tool, reactor component, and/or inspection device like a camera or VARD can be secured at the end of the arm opposite the shoulder. This rotatable extension may permit a relatively lightweight device to extend several meters transversely into a reactor without requiring any interaction from refueling apparatuses. In light of this extension, a float may be positioned away from the shoulder so as to counter torque on the shoulder from the arms and article(s) when immersed in water. Rotation of the shoulder and arms may be via vertical axes, so that the apparatus remains in a single axial plane or height in the reactor. The rotation may be accomplished with manual rotation, such as with a handling pole, or with local motors in example embodiment apparatuses. The arms may also rotate so as to overlap, permitting compact installation and removal. Power, controls, and/or data may be provided underwater to example embodiment apparatuses through an umbilical connection to operators.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
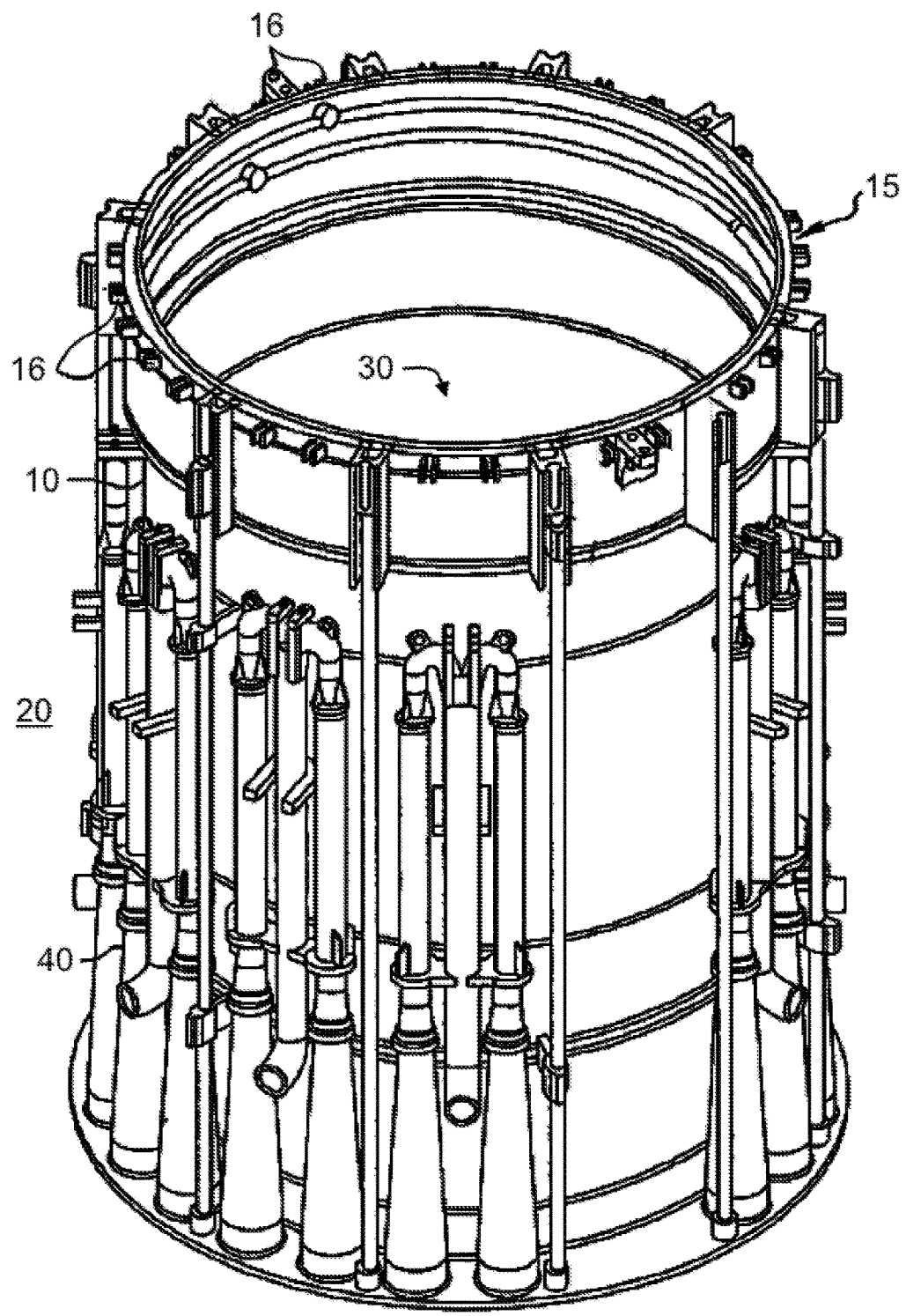
FIG. 1 is an illustration of a related art nuclear power vessel core shroud.

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the terms "and," "or," and "and/or" include all combinations of one or more of the associated listed items unless it is clearly indicated that only a single item, subgroup of items, or all items are present. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments.

As used herein, "axial" and "vertical" directions are the same up or down directions oriented along the major axis of a nuclear reactor, often in a direction oriented with gravity. "Transverse" directions are perpendicular to the "axial" and are side-to-side directions oriented in a single plane at a particular axial height.

The Inventors have newly recognized a need for reliable and non-interfering positioning in remote operations, including inspections. In some nuclear reactors during maintenance periods, cumbersome inspection equipment is operated from a refueling bridge or overhead crane and can interfere with refueling operations due to co-location with the refueling equipment. Furthermore, positioning with the fuel mast prevents inspection of other areas of a reactor not being refueled. While remotely-operated vehicles may avoid the problem of co-location with the refueling equipment, remotely-operated vehicles submerged in coolant do not have reliable positioning to ensure an inspection is at a verified position. Example embodiments described below uniquely enable solutions to these and other problems discovered by the Inventors.

The present invention is systems and apparatuses for positioning articles without interfering with refueling operations in a nuclear reactor. In contrast to the present invention, the few example embodiments and example methods discussed below illustrate just a subset of the variety of different configurations that can be used as and/or in connection with the present invention.

Figure 2:
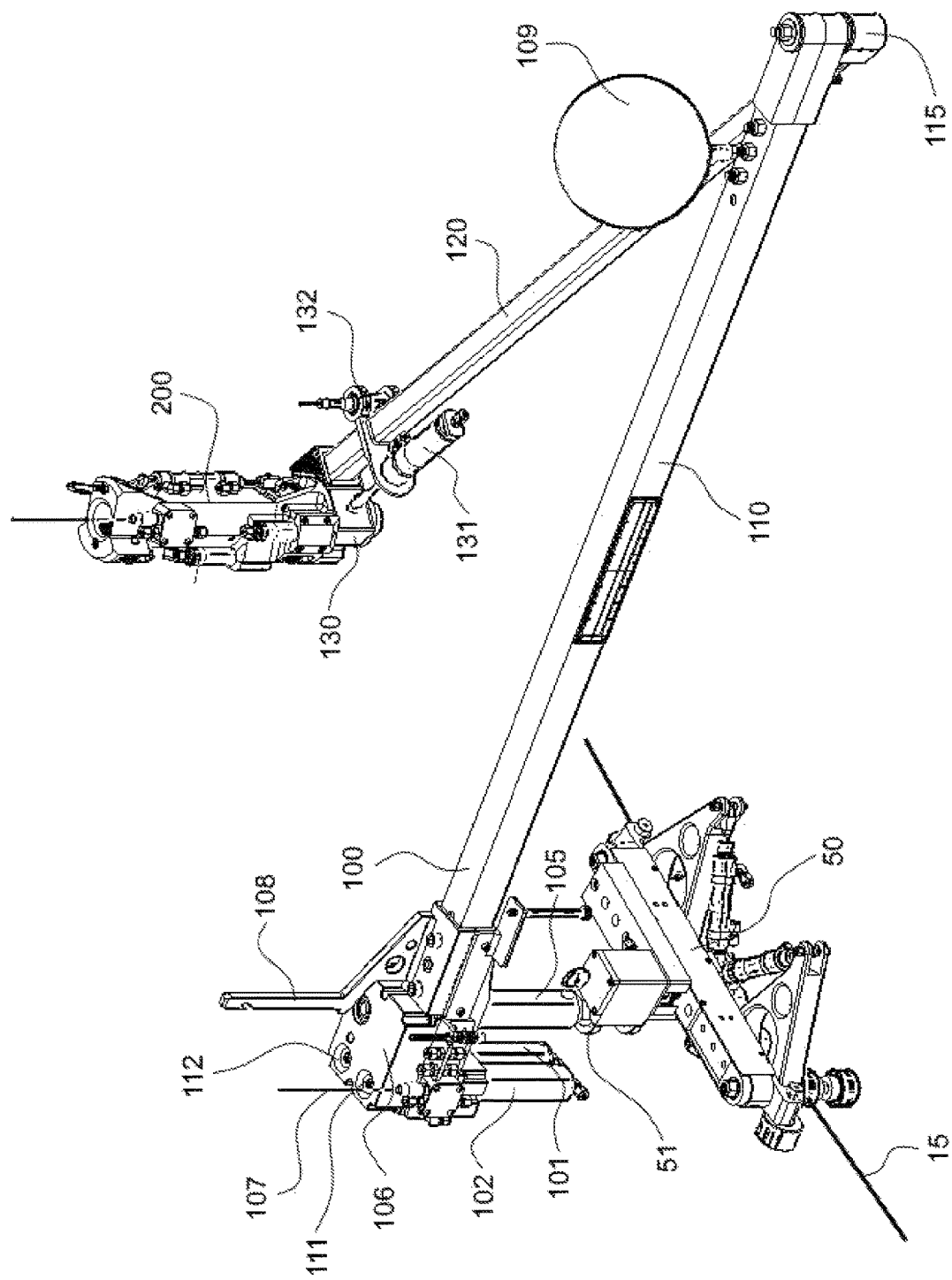
FIG. 2 is a perspective view of an example embodiment positioning and inspection apparatus.

FIG. 2 is an illustration of an example embodiment reactor positioning and inspection apparatus 100. As seen in FIG. 2, apparatus 100 may work with positioning device 50 from the incorporated '844 application. That is, positioning device 50 may be secured to, and move along a perimeter of, a steam dam or other ledged top of a nuclear reactor, and example embodiment apparatus 100 may be mounted to device 50 along the same. For example, device 50 may include central hex receiver 51, and example embodiment apparatus 100 may include hex mounting post 105 that seats into receiver 51, or device 50 and apparatus 100 may be joined in any other fashion. In this way, apparatus 100 can be supported, secured, and movable about a nuclear reactor, fuel pool, or other area for inspection and other operations, such as during a maintenance or refueling period, including periods of submersion and open air operations, depending on flooding levels.

Example embodiment positioning an inspection apparatus 100 includes shoulder 106, which may contain a large amount of its mass and be directly supported about a reactor or other inspection area. Shoulder 106 may include several powering and control features for other remote operations of apparatus 100, including motors 101 and 102 and associated transmissions, umbilical connection 107, mounting shaft 105, and installation guide 108. Umbilical connection 107 may connect data, power, pneumatics, controls, instrumentation, and/or any other external source to apparatus 100. For example, an electrical power and control signal line may be run through umbilical connection 107 underwater from operators above the reactor in open air on a refueling platform or bridge.

Example embodiment positioning and inspection apparatus 100 includes two jointed arms—back arm 110 and articulating front arm 120. As shown in FIG. 2, back arm 110 may be secured to shoulder 106 and extend in a transverse direction out to elbow 115. Back arm 110 may be hollow so as to convey power and data from shoulder 106 to elbow 115 and beyond.

Float 109 may be secured to back arm 110 toward elbow 115 to impart buoyancy and remove torque on shoulder 106 from weight of back arm 110. Float 109 provides a desired level of buoyancy in a fluid. As such, when immersed in a reactor coolant such as water, back arm 110 may carry power and instrumentation inside arm 110 and be relatively balanced and in an axial direction to avoid overly torqueing or rotating shoulder 106 and thus device 50 to which it may seat.

Front arm 120 extends beyond back arm 110 and articulates with respect to back arm 110 at elbow 115. For example, elbow 115 may be a stacked hinge or joint that allows front arm 110 to rotate about a vertical axis through elbow 115. Elbow 115 may also transmit power, data, instrumentation, etc. from back arm 110 to front arm 120, and front arm 120 may be similarly hollow to carry the same, ultimately to hand 130. Both front arm 120 and back arm 110 may have square cross sections to enhance shearing resistance to loads carried at their ends.

Front arm 120 terminates at hand 130 useable to carry and operate articles of interest such as tooling, instrumentation, components, etc. In the example of FIG. 2, a VARD 200 is clamped in hand 130 for video inspection of various core locations. Hand 130 may be capable of selective grasping via pneumatic cylinder 131 that opens and retracts hand 130. Pneumatic cylinder may be operated by the same instrumentation lines that rundown front arm 120 and back arm 110 from umbilical connection 107. Hand 130 may take on any desired shape or configuration to attach to or operate desired articles, and other operative devices besides pneumatic cylinder 131 may open, close, and otherwise operate hand 130, even when submerged in coolant. Camera mount 132 may separately hold another article, such as a camera working in association with VARD 200.

Figure 3:
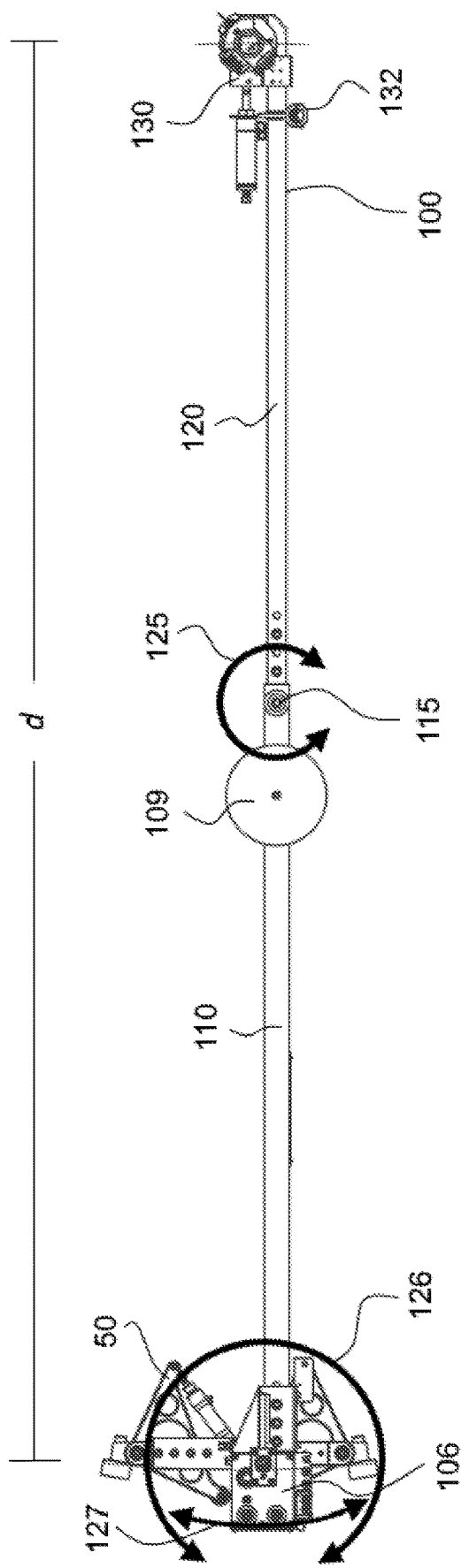
FIG. 3 is a top schematic view of the example embodiment positioning and inspection apparatus.

FIG. 3 is an overview schematic view of example embodiment positioning and inspection apparatus 100, illustrating operation of the same. Operations may be performed while apparatus 100 is mounted to device 50 underwater at an edge of a flooded reactor. As shown in FIG. 3, apparatus 100 is rotatable at shoulder 106 in direction 126, which may be rotation about a vertical axis at shoulder 106. Similarly, apparatus 100 is rotatable at elbow 115 in direction 125, which may be rotation about a vertical axis at elbow 115. Through circumferential movement of device 50 in direction 127, apparatus 100 may reach across to any reactor position. As such, any tool held in hand 130 may be positioned at nearly any desired transverse or angular position in a reactor through movement of apparatus 100 in directions 125, 126, and/or 127. Moreover, through known degrees of rotation in directions 125 and 126, position in direction 127, and known lengths of arms 110 and 120, the transverse position of any article held in hand 130 may be known with extreme precision in a reactor.

At maximum extension, with arms 110 and 120 straight, apparatus may reach a distance d, a radius that may potentially span several meters, such as 3 meters, nearing a radius of a commercial nuclear reactor. In this way instrumentation or inspection devices in hand 130 may be placed vertically overlapping any fuel position in a reactor. Similarly, apparatus 100 may collapse by rotating front arm 120 back through direction 125 to be partially or fully overlapping with back arm 110, presenting a much smaller transverse length of half d. Such a collapsed position may be useful during installation or removal, or during movement of device 50, to require less space. Apparatus 100 may also form any angle between front arm 120 and back arm 110, potentially reaching around other core structures or maintenance activities through rotation at elbow 115 and/or shoulder 106.

Rotation in directions 126 and 125 may be accomplished under local force generated by apparatus 100 or through remote powering. For example, as shown in FIG. 2, shoulder motor 101 may be connected to mounting post 105 through a transmission such as a gear train in shoulder 106. Shoulder motor 101 may rotate shoulder 106, and thus the remainder of apparatus 100, about post 105, which may be pivotable in direction 126. Similarly, elbow motor 102 may be connected to a post in elbow 115 through a transmission such as a transmission belt extending through shoulder 106 and back arm 110. Elbow motor 102 may rotate front arm 120, and thus any device held in hand 130, in direction 125.

Instead of using motors 101 and/or 102, rotation in directions 126 and 125 may be achieved through manual drives 111 and 112 (FIG. 2). For example, a handling pole or other actuator may mate with shoulder manual drive 111 and rotate the same to reproduce actuation of shoulder motor 101 and rotation about mast 105 in direction 126. Similarly, the handling pole or other actuator may mate with elbow manual drive 112 and rotate the same to reproduce actuation of elbow motor 102 and rotation about elbow 115 in direction 125. In this way, example embodiment apparatus 100 may retain mobility in directions 126 and 125 even through manual actuation.

By being positioned at shoulder 106 and transferring power through transmissions, motors 101 and 102 may keep weight and operations at shoulder 106, near umbilical connection 107 that may control motors 101 and 102. Other commands and power may also be provided through umbilical connection 107 through shoulder 106, presenting a relatively compact control interface and most massive aspect overlapping with device 50 at a periphery of a nuclear reactor, such as at steam dam 15. For example, actuation of pneumatic cylinder 131, and/or actuation of motors 101 and 102 may all be instructed by operators through umbilical connection 107, to position and otherwise operate apparatus 100 in a desired manner. Alternatively or additionally, command, control, and power may be locally present in shoulder 106 and other components through the use of batteries and wireless communications. In these ways, operators potentially quite remote from apparatus 100, such as above a flooded level in open air, may directly control and receive data from apparatus 100 underwater.

Example embodiment positioning and inspection apparatus 100 is fabricated of materials that are compatible with a nuclear reactor environment, including materials that maintain their physical characteristics when exposed to high-temperature fluids and radiation. For example, metals such as stainless steels and iron alloys, aluminum alloys, zirconium alloys, etc. are useable in shoulder 106, back arm 110, front arm 120, etc. Similarly, direct connections between components may be lubricated and fabricated of alternating or otherwise compatible materials to prevent seizing, fouling, or metal-on-metal reactions. By use of lighter-weight materials and hollow profiles, an example embodiment apparatus having a 1.5-meter back arm 100 may weigh 50 pounds or less.

Figure 4:
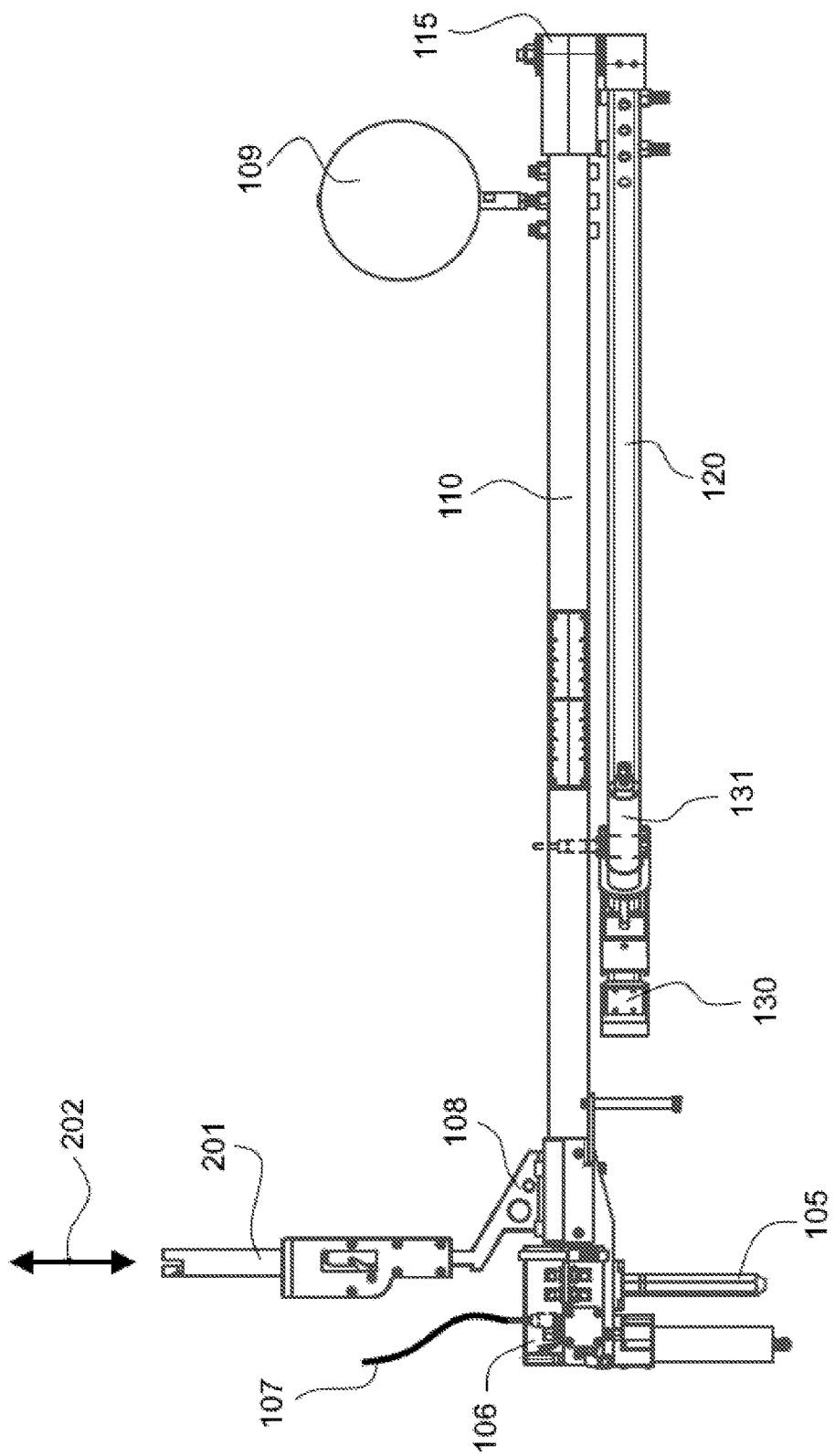
FIG. 4 is a side schematic view of the example embodiment positioning and inspection apparatus.

FIG. 4 is a profile schematic view of example embodiment positioning and inspection apparatus 100, illustrating an installation and/or removal of the same from an underwater environment. Although front arm 120 is shown as not fully withdrawn in FIG. 4, it is understood that front arm may be completely under back arm 110 and reaching back to shoulder 106 during installation or removal. As seen in FIG. 4, handling pole 201 may connect to install blade 108 through a lock-and-hook mechanism, auger-and-tang, mechanism, or any other selective fastener. When locked with install blade 108, handling pole 201 moves apparatus 100 with it, including in vertical direction 202. Handling pole 201 may be under control of an operator above the water level, either manually or through a crane or other powered connection. In combination with float 109, apparatus may thus be positioned at a desired vertical and transverse position through minimal effort via pole 201. For example, apparatus 100 may be joined to device 50 (FIG. 1) through installation actions and movement with handling pole 201 such that mast 105 seats into device 50. Of course, other installations and positionings of example embodiment apparatus 100 are easily achieved through proper motion of pole 201. Once installed, pole 201 may disengage from install blade 108 by releasing or unfastening from the same. For de-installation, handling pole 201 may be reattached to install blade 108 and removed from the environment in vertical direction 202.

Example embodiments and methods thus being described, it will be appreciated by one skilled in the art that example embodiments may be varied and substituted through routine experimentation while still falling within the scope of the following claims. For example, any number of different bases and tools can be used in example embodiment positioning apparatuses, simply through proper dimensioning and shaping. Such variations are not to be regarded as departure from the scope of these claims.

What is claimed is:

1. An apparatus for positioning articles at desired positions in a nuclear reactor, the apparatus comprising:

a shoulder having a rotatable mount configured to mount at an edge of the reactor;

a back arm extending from the shoulder; and a front arm rotatably connected to the back arm, wherein the front arm is shaped to hold an inspection apparatus at an end of the front arm farthest from the back arm, wherein the shoulder includes a motor and a manual drive both configured to rotate the front arm with respect to the back arm.

2. The apparatus of claim 1, further comprising:

an installation blade extending vertically upward from the shoulder, wherein the installation blade is shaped to selectively engage with a manual handling pole and move the entire apparatus.

3. The apparatus of claim 1, wherein the back arm connects to the front arm at an elbow permitting rotation of the front arm through a vertical axis with respect to the back arm.

4. The apparatus of claim 3, wherein the back arm and the front arm are at different vertical heights so that the front arm can be rotated at the elbow to fully overlap with the back arm vertically.

5. The apparatus of claim 1, wherein the rotatable mount is a mast extending vertically downward from the shoulder and rotatable on a vertical axis with respect to the shoulder, and wherein the shoulder includes a motor configured to rotate the shoulder with respect to the mast on the vertical axis.

6. The apparatus of claim 5, wherein the shoulder further includes a manual drive configured to rotate the shoulder with respect to the mast on the vertical axis.

7. The apparatus of claim 1, wherein the front arm includes a moveable clamp at the end of the front arm.

8. The apparatus of claim 1, further comprising:

a connection providing power and data to the shoulder when submerged in a fluid from operators outside the fluid.

9. An apparatus for positioning articles at desired positions in a nuclear reactor, the apparatus comprising:

a shoulder having a rotatable mount configured to mount at an edge of the reactor;

a back arm extending from the shoulder; and a front arm rotatably connected to the back arm, wherein, the front arm is shaped to hold an inspection apparatus at an end of the front arm farthest from the back arm, the back arm connects to the front arm at an elbow permitting rotation of the front arm through a vertical axis with respect to the back arm, and the back arm and the front arm are at different vertical heights so that the front arm can be rotated at the elbow to fully overlap with the back arm vertically.

10. The apparatus of claim 9, further comprising:

an installation blade extending vertically upward from the shoulder, wherein the installation blade is shaped to selectively engage with a manual handling pole and move the entire apparatus.

11. The apparatus of claim 9, wherein the front arm includes a moveable clamp at the end of the front arm.

12. The apparatus of claim 9, further comprising:

a connection providing power and data to the shoulder when submerged in a fluid from operators outside the fluid.

13. The apparatus of claim 9, further comprising:

a float positioned on the back arm away from the shoulder so as to counter torque on the shoulder from the back arm and the front arm when immersed in water.

14. An apparatus for positioning articles at desired positions in a nuclear reactor, the apparatus comprising:

a shoulder having a rotatable mount configured to mount at an edge of the reactor, wherein the rotatable mount is a mast extending vertically downward from the shoulder and rotatable on a vertical axis with respect to the shoulder, and wherein the shoulder includes a motor configured to rotate the shoulder with respect to the mast on the vertical axis;

a back arm extending from the shoulder; and a front arm rotatably connected to the back arm, wherein the front arm is shaped to hold an inspection apparatus at an end of the front arm farthest from the back arm.

15. The apparatus of claim 14, further comprising:

an installation blade extending vertically upward from the shoulder, wherein the installation blade is shaped to selectively engage with a manual handling pole and move the entire apparatus.

16. The apparatus of claim 14, wherein the front arm includes a moveable clamp at the end of the front arm.

17. The apparatus of claim 14, further comprising:

a connection providing power and data to the shoulder when submerged in a fluid from operators outside the fluid.

18. The apparatus of claim 14, further comprising:

a float positioned on the back arm away from the shoulder so as to counter torque on the shoulder from the back arm and the front arm when immersed in water.

\* \* \* \* \*